July 26, 1960
W. C. BORNEMANN
2,946,154
LIQUID DISPENSER WITH METERING MEANS AND POROUS APPLYING MEANS
Filed Oct. 3, 1958
3 Sheets-Sheet 1
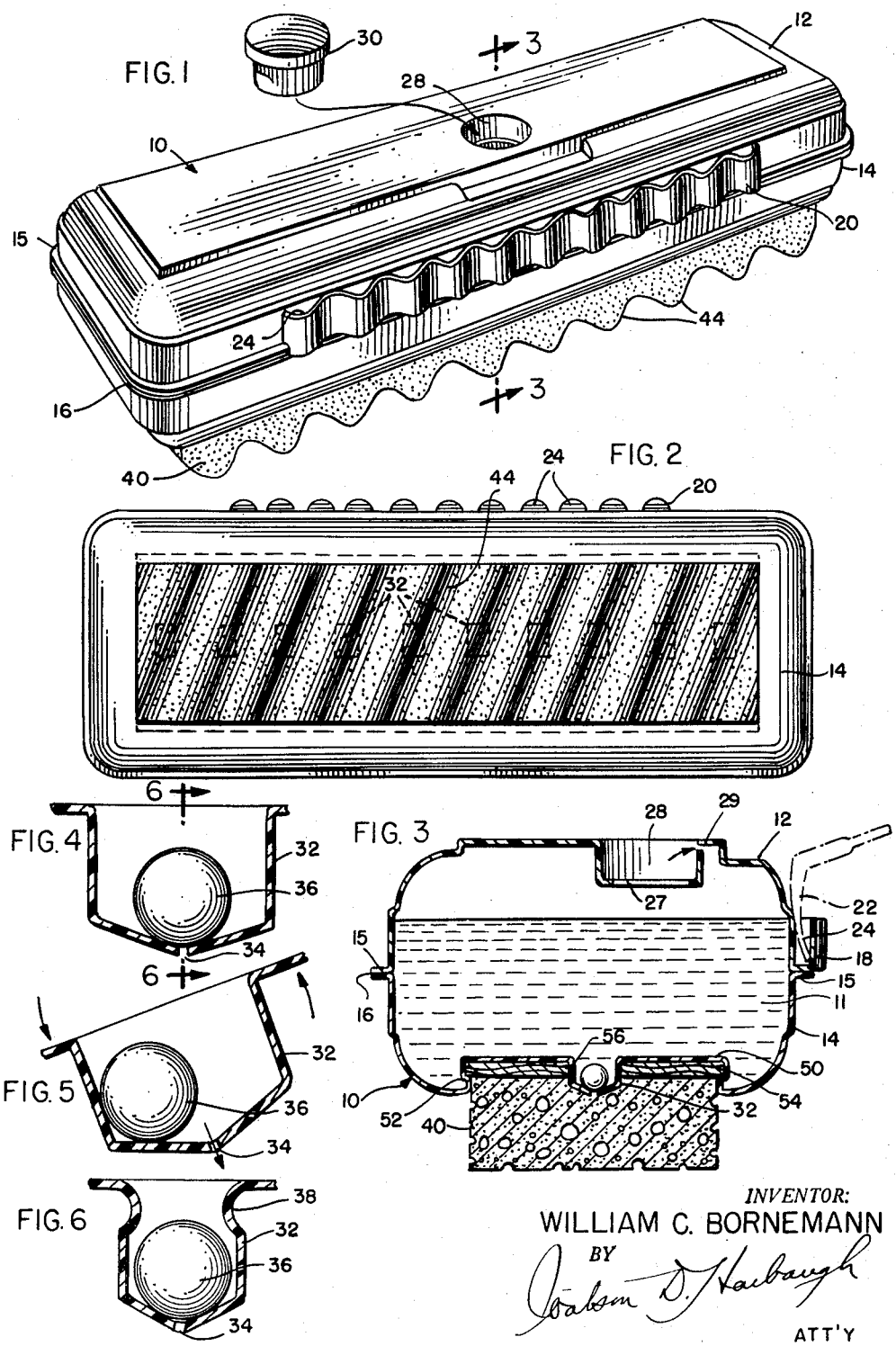
INVENTOR:
WILLIAM C. BORNEMANN
BY
ATT'Y July 26, 1960
W. C. BORNEMANN
2,946,154
LIQUID DISPENSER WITH METERING MEANS AND POROUS APPLYING MEANS
Filed Oct. 3, 1958
3 Sheets-Sheet 2
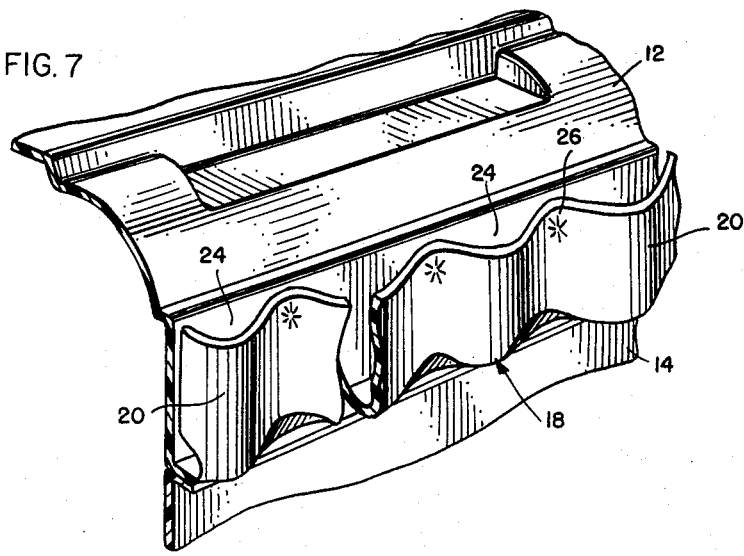
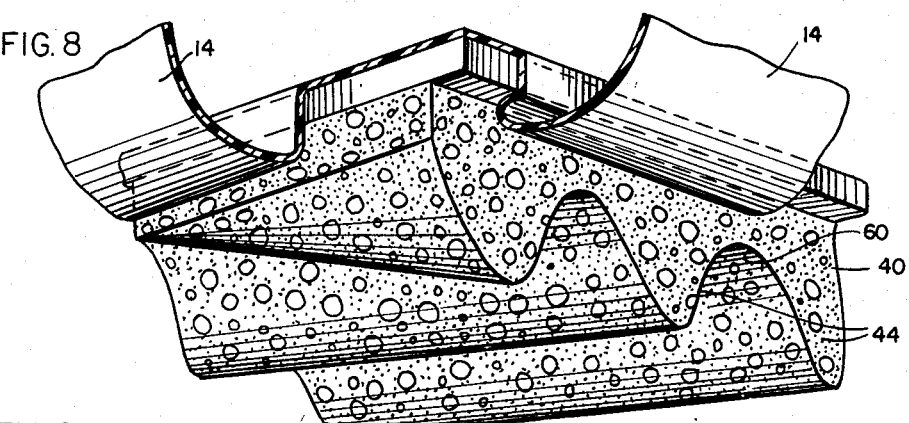
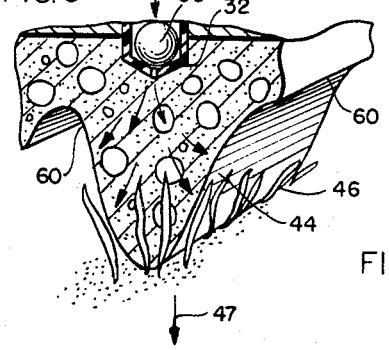
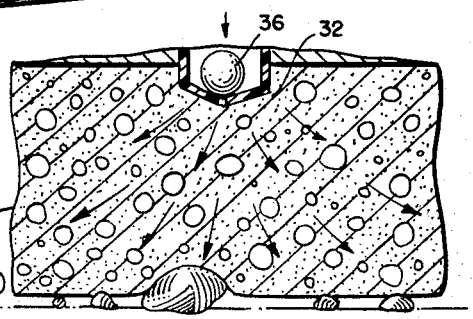
INVENTOR:
WILLIAM C. BORNEMANN
BY
ATT'Y.

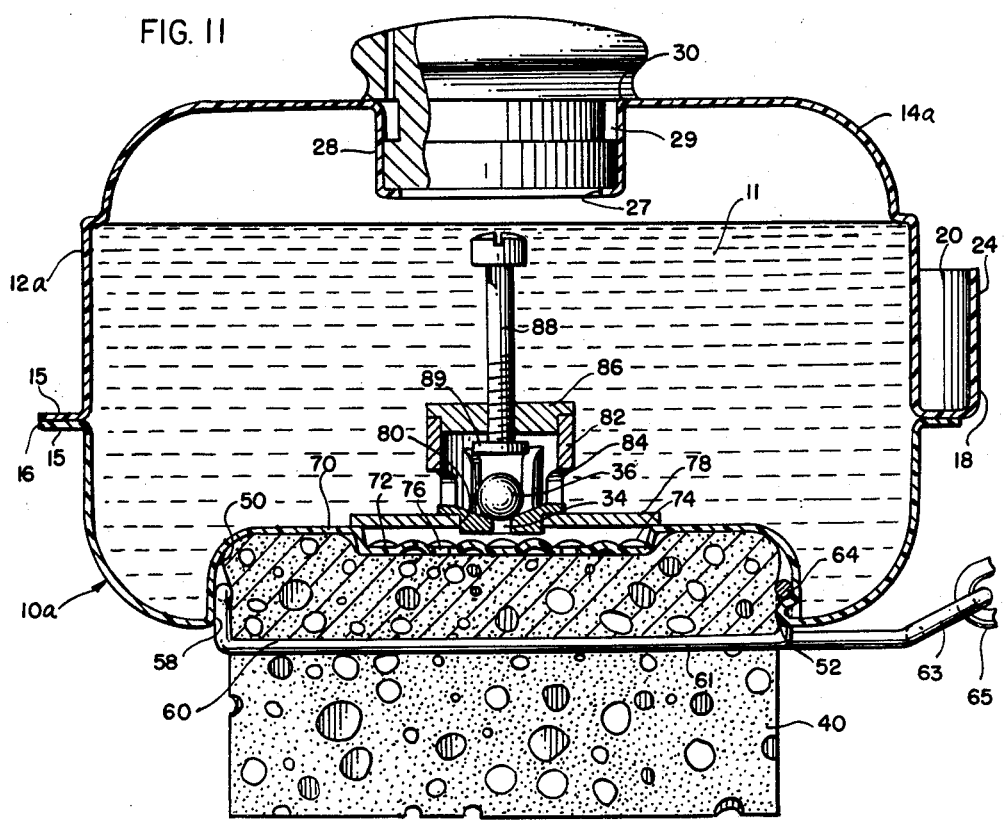

United States Patent Office 2,946,154
Patented July 26, 1960

2,946,154

LIQUID DISPENSER WITH METERING MEANS AND POROUS APPLYING MEANS

William C. Bornemann, Villa Park, Ill., assignor, by mesne assignments, to Fleming Sales Company, Inc., Chicago, Ill., a corporation of Illinois Filed Oct. 3, 1958, Ser. No. 765,215

14 Claims. (Cl. 47—1)

This invention relates to a means for applying and distributing liquids, and in particular it pertains to a device designed for spreading weed-killing chemicals that are in liquid form.

There are two general types of weed-killing chemicals, namely, the systemic type and the contact type. The systemic type is applied to the soil and attacks the weed plant through the root system. The contact type must be applied directly to the feeding surfaces of the weed plant, which are the leaves. Commonly, the liquid poisons are not systemic but are of the contact type, effective only when brought into actual contact with the leaves.

Usually, such liquid poisons are applied by spraying. In a typical spraying operation, spray drift harms desirable plants and furthermore the spray is directed in uneven movements and distributed more or less according to the guesswork of the sprayer. Since some good areas are harmed and other areas are unevenly sprayed, this method of application has many shortcomings which cause undue damage and gives uneven results.

Furthermore with regard to the liquid used in spraying techniques, volatility has to be enhanced at the expense of killing effectiveness because of the higher volatility of the concentrates required. This volatility also augments the dangers to desirable plants and is subject to conditions and waste.

Spraying is also a particularly wasteful method of applying a contact poison within a given area itself. A spray is comprised of a quantity of discrete droplets, and in a distribution of these droplets over an area of weed plants, at least one fourth of the liquid poison falls to the ground in between the plants and is wasted. In other words even without wind loss and danger to distant desirable plants at least one gallon of poison out of every four is lost and wasted by the spraying process.

In addition, the droplets of poison that succeed in reaching the feeding surfaces of the weed plants remain on those surfaces as tiny, discrete drops which cover only a fraction of the total feeding surface of the weed plant. These may or may not be effective, depending on the size and number of the droplets.

To improve the method of applying a liquid weed killer so that the above mentioned disadvantages are corrected and to attain certain new and improved results, one object of the invention is to provide a means for applying the poison to the weeds directly by wiping on a large surface of the weed with a more concentrated liquid poison which is greatly fortified with waterproof fixers to anchor the poison to the leaf for longer periods of contact and with volatility reduced to a minimum to eliminate danger to desirable plants close by.

A further object is to provide a means for spreading the poison so that it is distributed evenly over the area to be weeded with some additional saving of liquid because of its poor affinity to barren spots of dry ground.

Another object is to effect a saving of over one-fourth of the liquid weed poison by applying substantially all of it directly to the weeds, thereby wasting little of it on the ground and none by wind conditions, air movement no longer being a factor that eliminates working on windy days.

An additional object is to provide a device which requires no pumping and which may be easily engaged by a common garden rake or a string halter so that it may be pulled across the weed areas with no hose connections or carried pressure tanks.

Another object is to provide a device which will automatically meter the flow of liquid to the weed area when in motion, but will not release liquid when at rest in approximately level position.

A further object is to provide a device easily filled and emptied, easily cleaned and serviced, and easily stored; and which is rugged in construction and of substantial weight throughout use to assure intimate application contact.

In order to accomplish the above objects, one embodiment of the present invention comprises an elongated tank mounted parallel to and resting on a rectangular sponge of similar length. The tank is provided with a filler hole in the top, and has a removable filler cap for sealing the hole. The bottom of the tank has one or more recessed holes, each of which is sealed by ball checks which close the ports when the tank is level. When the tank is tilted or jiggled as when pulled across the lawn, the balls are repeatedly dislodged and the ports opened, metering the liquid through the ports to the sponge under the tank. The bottom surfaces of the sponge contain large, transverse lands which are designed to roll, twist and wipe the weeds as the sponge lands passes over them, so that a maximum surface of the plant is coated with the poison. The front of the tank has a corrugated strip which is designed for the insertion of the prongs of a garden rake, so that the tank may be dragged using the rake as a handle.

So that the present invention may be more clearly understood, applicant now refers to the drawings, in which:

Fig. 1 is a perspective view of the invention showing the preferred embodiment;

Fig. 2 is a bottom view of the dispenser;

Fig. 3 is a sectional view taken along line 3—3 of Fig. 1 showing the rake in phantom;

Fig. 4 is a sectional view of the ball valve showing the ball seated on the valve port;

Fig. 5 is a sectional view of the ball valve showing the ball in an unseated position in which the valve port is open;

Fig. 6 is a sectional view of the ball valve showing how the ball is maintained in proximity to the valve port by a double crimping of the walls of the ball valve well;

Fig. 7 is a partially sectional view of the tank, showing the corrugated section of the side of the tank and the holes formed by the corrugation, which are designed to receive the prongs of a garden rake;

Fig. 8 is a perspective view showing the sponge mounted below the tank with the grooves slanting across it;

Fig. 9 is a perspective view showing the sponge and how the angle of the grooves causes the sponge to roll the weed plants to the side as it passes over them;

Fig. 10 is a sectional view of the sponge and a ball valve, showing how the liquid is metered out to the sponge;

Fig. 11 is a vertical sectional view similar to Fig. 3 showing a modification of the invention; and Fig. 12 is a bottom view similar to Fig. 2 showing the modification of Fig. 11.

So that the present invention may be understood in greater detail, applicant now refers to the drawings in which:

Fig. 1 shows the elongated tank 10 which contains the fixer-fortified weed killer liquid 11 of low volatility and high concentration. The tank is constructed of high impact polystyrene by assembling the vacuum formed upper half 12 and the lower half 14 and sealing them together along mating flanges 15 forming a seam 16. A sectional view of this seam 16 is provided in Fig. 3. The upper half 12 of the tank 14 has a lip 18 along one flange edge which is bent up from the seam 16 and corrugated as at 20 so that the teeth of a garden rake 22 may be inserted into the grooves 24 formed by the corrugation. The corrugation 20 is also shown in Fig. 1, Fig. 2 and Fig. 7. The upper edge of the corrugation 20 is affixed as at 26 preferably by an adhesive to the side of the top half of the tank for strength.

A filler well 28 is provided in the top of the tank having an opening 27 in the bottom and a vent 29 at the top which allows the tank to be filled or emptied. A closure 30 is received in the well 28 and held in place by friction.

Countersunk into the bottom of the tank are one or more valve wells 32 (Fig. 2) having a concave conical bottom which defines a taper having approximately an included angle of 150°. Each valve well 32 is apertured at its apex to provide a port 34, Figs. 4, 5 and 6. A ball 36 having a specific gravity of from 2 to 4, such as glass, is retained loosely in the valve well by a crimping of the valve well sides as at 38 (Fig. 6). The ball 36 normally seats over the valve port 34 whenever the tank is in level position, as shown in Fig. 4, thereby preventing any flow of liquid from tank when the tank is in a horizontal resting position. When the tank is jarred, jiggled or tilted, the ball 36 rolls away from the valve port 34 repeatedly as in Fig. 5 and allows the liquid to flow through the port.

The tank is mounted on a sponge 40 preferably made of neoprene or a plastic with the valve ports opening directly into the body of the sponge at top thereof as may be seen in Figs. 3, 9 and 10. The sponge is preferably of a small pore type having a multitude of labyrinth flow passages of small size. The dispersal of the liquid from the valve ports into and through the sponge is diagrammatically shown in Fig. 10.

The bottom of the sponge presents deep parallel transversely extending ridges 44 (Fig. 2) of soft yielding liquid bearing sponge material which are angled away from the direction of the path of the dispenser enough to wipe a continuous path as they are moved in a direction crosswise to the tank 10. In operation, reference is made to Fig. 9 which is a front perspective view partly in section of one of these deep sponge ridges 44 showing how the slight angle of the ridge causes the weed plants 46 to be rolled and wiped as it passes over them in the direction of arrow 47, thus wetting all sides with the liquid. Further views of the sponge ridges are given in Figs. 1, 2, 8 and 10 showing the structure and operation of the sponge ridges.

In mounting the sponge rubber on the tank, two forms are shown. In both the bottom of the tank is recessed upwardly at 50 and bordered with overhanging inwardly projecting flanges 52 along the side edges thereof. In Fig. 3 these flanges receive in snap relation between and above them a plywood board 54 upon which the sponge 40 is glued with holes 56 therethrough to accommodate the walls 32. In Figs. 11 and 12 the flanges 52 are notched 58 at spaced intervals corresponding to the ends of the valleys 60 between the ridges 44 and a sinuous ⅛" wire 61 of mild work hardened steel is provided with cross members 62 resting in the valleys with downwardly disposed loops 64 that snap under the flanges 52 and with the connecting legs disposed in the notches 58. These fastenings hold the sponge in place under working conditions yet are releasable to permit the sponge to be squeezed and flushed if desired. At opposite ends the wire 61 loops are formed to receive a harness (not shown) to draw the tank in lieu of a rake.

The weed poison dispenser operates as follows: With the tank in level position, the filler cap is removed, and the tank filled with a high potency liquid weed poison solution. The filler cap is replaced, and a garden rake or like article is attached to the tank by inserting the teeth of the rake into the holes formed by the corrugations on the front of the tank. Weed killer soaks down through sponge from the tank. The handle of the rake may now be used to pull the dispenser across a lawn with the weight thereof effective to press the sponge ridges yieldably into intimate contact with weeds and to wipe, roll and wipe the weeds with a sponge surface wetted with weed killer.

Soaking of the sponge is accomplished first by tilting the tank as shown and described in connection with Fig. 5 to open the ports 34 for a brief period of time. Thereafter, the dispenser is subjected to slight jars, jiggling and tipping, as it is being pulled across a lawn, dislodging the balls momentarily and repeatedly from the ports and allowing the liquid in the tank to seep through the valve holes into the sponge. This meters the flow of liquid to the sponge and keeps it soaked. The dispenser is then dragged across the weeds in straight parallel paths that slightly overlap, and thus it is possible for a very large area to be covered quickly and thoroughly.

The effectiveness of the sponge is greatly increased by the angling of the transverse ridges in the bottom. Since these ridges are fixed at an angle to the path of the dispenser, they move across the weed plants at an angle, rolling them to the side and pressing them down. This rolling action coats the larger part of the feeding surface of the weed plant with poison. This coating is not in the form of droplets, but is a total wetting of the surface covered.

Since the sponge is not normally in contact with the ground, none of the poison is wasted because small bare spots are bridged or relieved of a weighted wiping contact by the weeds around the bare spots supporting the tank in weighted wiping contact and all of the poison is applied to the feeding surfaces of the weeds. Even when the sponges do contact the ground there is little loss of poison due to an experience like that of trying to brush paint on the surface of a sand hill. Any dirt adhering to the sponge quickly falls off when weeds are again contacted.

When the tank is to be stored it can be either emptied or set in a flat position such as shown in Fig. 3 where the balls 36 close the ports 34. The rake of course is detached.

In Figs. 11 and 12 a further modification is shown wherein the bottom wall 70 is beaded 72 on its upper surface to provide a honeycomb of passages 74 for liquid to flow therethrough every so often and with any degree of frequency desired by a manufacturer. The wall is perforated with small apertures 76 in the floor of the passages to permit liquid to pass therethrough to soak the sponge 40. A plate 78 covers the beaded area 72 and seals it from the interior of the tank. A hole 80 punched through the plate receives a ball check valve body 82 as shown with openings 84 in the sides thereof to permit flow of liquid into and through the body. The ball 36 cooperates with a port 34 as already described and a spider or cover 86 closes the top of the body and carries a screw 88 thereon accessible through the filler opening 27 thereabove to adjust the amount of excursion permitted to the ball including holding the ball shut by a movement limiting washer 89 carried on the lower end of the screw. With this arrangement metering of liquid flowing can be adjusted to conditions according to the desires of the operator.

Having thus described the invention and the modifications thereof it will be readily apparent to those skilled in the art how various and further modifications may be made in the accomplishment of the stated objects within the scope of the invention which is commensurate with the appended claims:

I claim:

1. In a liquid dispenser, a tank for receiving a weed killer liquid therein, a resilient sponge member supporting said tank and having parallel ridges on the bottom adapted to engage the ground, valves for metering liquid from said tank to said sponge member, and means for propelling said porous element over the ground with weight of the tank and liquid thereon in a wiping liquid transfer relationship to vegetation on said ground, said ridges being angled to the direction of movement of the tank over the ground.

2. In a liquid dispenser, a porous pad, ridges on the bottom of the pad, a tank mounted on said porous pad, valves countersunk in the bottom of said tank and into the body of said porous pad, and means provided on said tank for attachment of a handle to pull the tank at an angle to said ridges.

3. In a liquid dispenser, a porous sponge element, transversely extending ridges on the bottom of said sponge, a tank mounted on said sponge element, conduit means for conveying liquid by gravity from the tank to the sponge including a valve well in the bottom of said tank having a port in the bottom thereof, and movable ball elements in said valve well, said ball gravitating to close the port when tank is motionless and level.

4. The combination called for in claim 3 in which the bottom of the tank includes flange elements, said combination including means for fastening said sponge to the tank in contact with said port comprising a sinuous wire releasably engaging said flanges and embracing said sponge element in supported relationship.

5. The combination called for in claim 3 including an adjusting screw for controlling the excursion of the ball with respect to said port.

6. In a liquid dispenser, a porous sponge, ridges in the bottom of said sponge at an angle to the pulling path of the dispenser, a tank comprising a top and bottom half sealed together, an extension of the front edge of the top half of said tank being bent upwardly and corrugated to receive the teeth of a rake to determine the direction of the pulling path.

7. In a liquid dispenser, a porous pad, ridges in the bottom of said pad, a tank resting on said porous pad, a valve in the bottom of said tank to meter the flow of liquid from the tank to the pad, and means for securing the pad to the tank including tow elements at opposite ends of the tank.

8. In a liquid dispenser, a porous element adapted to engage the ground, a tank supported above and in weight-borne relationship on said porous element, valve means for metering liquid from said tank to said porous elements including a valve compartment having a valve port and an inertial valve member closed by gravity against said valve port and movable in a horizontal direction from valve closing position by horizontal movement of the tank, and means for propelling said porous element over the ground in wiping liquid transfer contact with vegetation on said ground.

9. The combination called for in claim 8 in which the bottom wall of the valve compartment is inclined from the horizontal towards the valve port to form a shallow concavity of greater horizontal dimension than the horizontal dimension of said inertial valve member.

10. In a liquid dispenser, a tank for receiving a weed killer liquid therein, a resilient sponge member supporting said tank and having parallel ridges on the bottom adapted to engage the ground, valves for metering liquid from said tank to said sponge member including shallow valve compartment recesses having valve ports at the bottom thereof and inertial valve elements movable laterally from a position closing said valve port, and means for propelling said porous element over the ground with weight of the tank and liquid thereon in a wiping liquid transfer relationship to vegetation on said ground, said ridges being angled to the direction of movement of the tank over the ground.

11. In a liquid dispenser, a porous element, a tank mounted on said porous element to receive the top of said element therein, a downwardly offset portion of the bottom of the tank having an opening embedded in said element, and valve means in said tank for metering liquid from the tank to said opening to transmit liquid to said porous element.

12. In a liquid dispenser, a porous element defining depending protuberances on the bottom thereof, a tank carried by said porous element in weight-bearing relation, a liquid distribution channel having an upwardly beaded bottom wall with a plurality of perforations in the floor thereof, and a valve in said tank for metering liquid to said channel to deliver liquid through said perforations to said porous element to soak it.

13. In a liquid dispenser, a porous sponge element, transversely extending ridges on the bottom of said sponge, a tank mounted on said sponge elements, a funnel extending downwardly into the tank having a lateral opening near the top of the tank to vent the tank against vacuum conditions, a plug for closing the lower end of the funnel, conduit means for conveying liquid by gravity from the tank to the sponge including a valve wall in the bottom of said tank having a port in the bottom thereof directly below said funnel, movable ball elements in said valve well, said ball gravitating to close the port when tank is motionless and level and means accessible through said funnel for controlling lateral movement of said ball.

14. In a liquid dispenser, a porous pad, ridges in the bottom of said pad, a tank resting on said porous pad and having flanges on opposite edges of said pad, a valve in the bottom of said tank to meter the flow of liquid from the tank to the pad, sinuous means received under said flanges and extending across the bottom face of said porous pad for securing the pad to the tank in contact with the bottom of the tank.

References Cited in the file of this patent

UNITED STATES PATENTS

| | | |
|---|---|---|
| 2,028,079 | Steigerwald | Jan. 14, 1936 |
| 2,316,040 | Wirfel | Apr. 6, 1943 |
| 2,509,568 | Lachapelle | May 30, 1950 |
| 2,605,587 | Wester | Aug. 5, 1952 |
| 2,659,918 | Stoner | Nov. 24, 1953 |
| 2,754,624 | Wester | July 17, 1956 |
| 2,770,828 | Ellman | Nov. 20, 1956 |

FOREIGN PATENTS

| | | |
|---|---|---|
| 114,164 | Australia | Nov. 13, 1941 |